United States Patent [19]
Becker

[11] 3,917,338
[45] Nov. 4, 1975

[54] COMBINED POST AND TIE-DOWN ANCHOR

[75] Inventor: Robert L. Becker, Louisville, Ky.

[73] Assignee: Dealers Truck Equipment Inc., Louisville, Ky.

[22] Filed: Apr. 2, 1974

[21] Appl. No.: 457,210

[52] U.S. Cl. .............. 296/28 M; 105/423; 105/478; 280/179 A
[51] Int. Cl.² ............................................ B60J 5/06
[58] Field of Search..296/28 M; 280/179 A, 179 R; 105/369 R, 369 A, 369 B, 369 D, 423, 469, 475, 478, 480, 493, 497

[56] References Cited
UNITED STATES PATENTS

| | | | |
|---|---|---|---|
| 2,716,383 | 8/1955 | Johnson | 280/179 R X |
| 3,709,552 | 1/1973 | Broadbent | 296/28 M |
| 3,815,500 | 6/1974 | Glassmeyer | 296/28 M X |

*Primary Examiner*—David Schonberg
*Assistant Examiner*—Michael J. Forman
*Attorney, Agent, or Firm*—Lowe, King & Price

[57] ABSTRACT

A combined reinforced post and lading tie-down anchor for a wall of a cargo container includes a channel-shaped support post attached to the wall and an anchor in the form of an elongated strip slidingly engaging flanges on the lateral edges of the support post. The anchor has openings for accomodating lading tie-down hooks. A method of constructing a cargo container having a combined post and tie-down anchor is also disclosed.

5 Claims, 4 Drawing Figures

U.S. Patent  Nov. 4, 1975  3,917,338
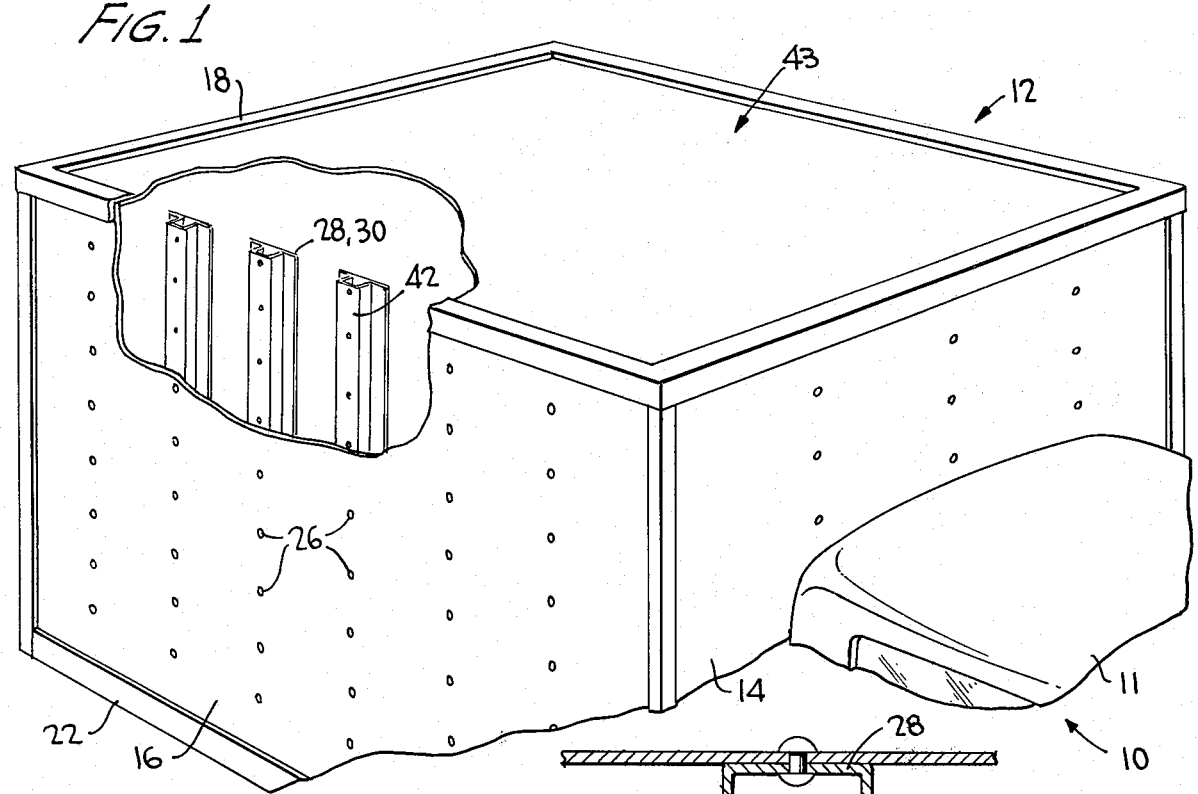
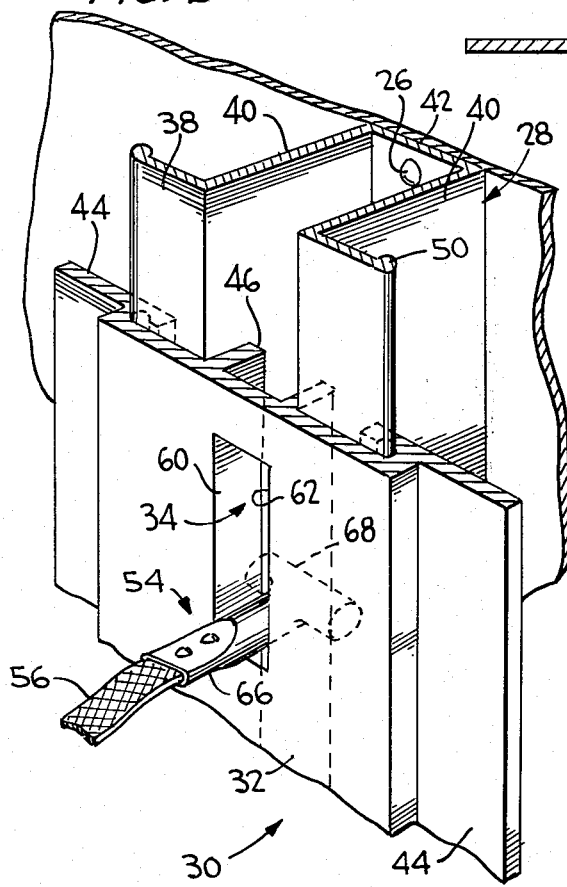
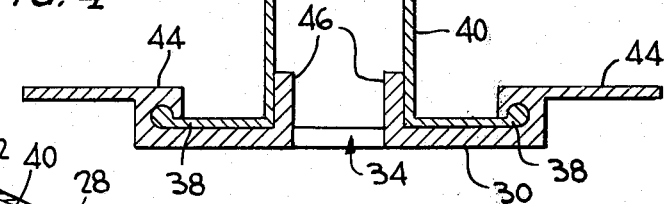
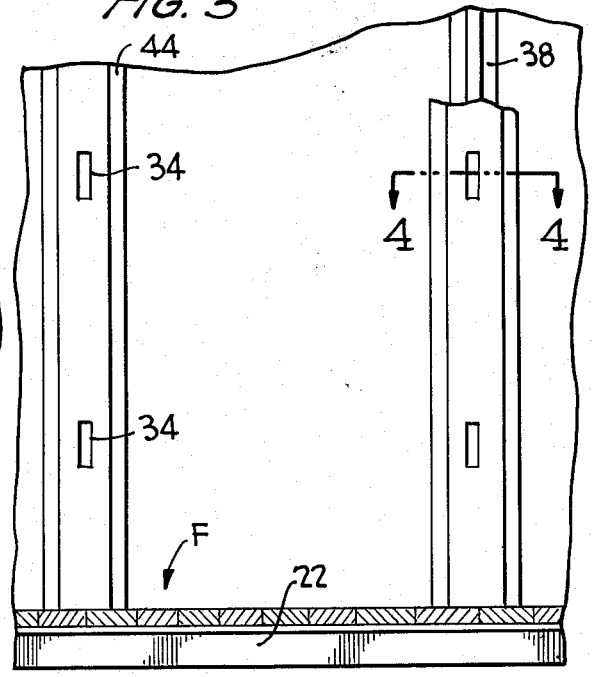

COMBINED POST AND TIE-DOWN ANCHOR

BACKGROUND OF THE INVENTION

The present invention relates in general to cargo containers, and more particularly, to the construction of a reinforced post with integral tie-down anchor for a container wall.

In the transportation of cargo, it is desirable to secure the cargo in the truck van body or the like against shifting during transit to prevent costly damage to goods. Another desideratum is that the cargo handler should be able to reliably secure the cargo in a fast and simple manner. One convenient method of cargo tie-down employs straps or cables secured about the cargo and, in turn, attached to the walls of the cargo container. To assure reliability, the tie-down straps as well as the attaching means on the wall should be strong enough to take the strain of a potential shifting load of several thousand pounds under heavy braking or acceleration of the truck. The container attaching means should also be adaptable to a wide variety of cargo sizes and positions within the carrier.

It is also desirable, as with any part of a cargo container, that the attachment means be easily installed and able to be quickly serviced when collision damage is being repaired to minimize equipment downtime.

The present invention achieves the foregoing results by providing an improved full-length anchor plate which slidingly engages a cargo container support and is locked in position by the edge cap and floor of the body during construction of the container. Thus, the assembly post not only provides tie-down capability along the height of the container, but also advantageously reinforces the support post.

SUMMARY OF THE INVENTION

Briefly, the apparatus of the present invention comprises a lading tie-down means, which extends over the full height of a cargo container so as to serve as a reinforcement of the wall structure of the container. The combined support post and tie-down means includes as a first element, a channel-shaped support post mounted on the wall with its open channel section facing inward and having a pair of oppositely directed flanges on the lateral edges thereof. The second element of the combination is an anchor in the form of an elongated plate slidingly engaging the post flanges and, as noted, extending longitudinally thereon for substantially the entire length of the support post. The anchor has slots formed at selected locations along the length thereof adapted to receive hooks on the ends of tie-down straps. Inwardly extending bosses integral with the central portion of the anchor provides extra rigidity to resist bending when a load is thus applied thereto through the strap. The slots also register with the open space between the legs of the support post so that the load is always applied along the center line of the post and anchor combination.

Grooves along the length of the anchor provide sliding engagement between said anchor and the flanges of the support post. These grooves serve as guide means on the rear face of the central portion of the anchor to insure the desired secure lateral engagement between the anchor and the support post. The anchor is preferably locked against longitudinal movement with respect to the post by engagement with the edge cap at the top and with the side rail at the bottom.

A related method of constructing a cargo container using the tie-down means of the present invention includes the steps of placing the support posts on the walls, securing the walls to the posts, and slidingly engaging the full-length anchors thereon prior to positioning and installing the edge cap and roof of the container.

OBJECTIVES OF THE INVENTION

It is therefore a broad objective of the present invention to provide an improved lading tie-down anchor and full-length reinforcement means for the support posts of a cargo container.

Another objective is to provide a lading tie-down anchor which is easily installed and serviced and enables the quick use of conventional tie-down straps.

Another objective is to provide a cargo tie-down anchor which is easily and quickly locked in position simply by the blocking engagement of the edge cap and side rail of the container.

Other objects, features and advantages as well as a fuller understanding of the invention may be had by referring to the following description and claims, taken in conjunction with the accompanying drawings.

BRIEF DESCRIPTION OF THE DRAWING

FIG. 1 is a perspective view (partially cut-away) of a truck-mounted cargo container including combined anchor and support post for securing the cargo to the interior of the container in accordance with the present invention;

FIG. 2 is a perspective and cut-away view of an anchor constructed in accordance with the invention and slidingly engaging a support post on the container;

FIG. 3 is an elevation view of the anchor-post combination in the cargo container; and FIG. 4 is a cross-section along line 4—4 of FIG. 3 of the anchor in position on a support post.

DETAILED DESCRIPTION OF THE PREFERRED EMBODIMENT

With reference to the drawings, the apparatus of the invention is illustrated as being utilized in a cargo container 12, which may form part of a transport vehicle, such as truck 10 having a driver's cab 11. The usual overhead door (not shown) may be provided at the rear 18 of the truck 10. It is to be understood that the cargo container 12 embodying the improved structure of this invention is representative of one use, and that other uses in other types of containers and in other environments in accordance with the broader aspects of the invention are contemplated.

As shown, the cargo tie-down means comprises an elongated anchor plate 30 slidingly connected to a support post 28 which has been attached by means such as rivets 26, to an outer wall or skin 16. A plurality of these post and anchor assemblies 28, 30 support each of the container walls 14 and 16. The walls 14, 16 are secured to floor F by side rail 22 and the roof 43 is secured to the walls by means of edge cap 23.

The support posts 28 are preferably pre-formed extruded aluminum of channel or U-shaped cross-section, as shown in FIG. 2. The channel or open portion 52 having side walls 40 is facing inwardly toward the cargo container interior. Attached to and integral with side walls 40 are oppositely extending lateral flanges 38 having outer edges 50.

Although the posts 28 are preferably formed of a light-weight material, such as aluminum, as noted above, other materials capable of withstanding expected stresses may be used. For example, light-weight steel or other alloys may be acceptable where weight is not a primary consideration.

An important feature of the present invention is the improved structural strength of the post and anchor assemblies 28, 30 regardless of the material used. Stresses placed on post 28 are, for example, weight from the roof 43, which may have snow or ice thereon, wind stresses placed on the walls, and pulling stresses due to the tie-down of cargo carried in the container. Other considerations in developing the post and anchor assembly 28, 30 of the present invention are the advantages of cost and efficiency of manufacture thereof, including ease of installation, as well as other normal manufacturing considerations, such as there being no need for separate fasteners to interconnect the two parts of the assembly. Preferably, not only are the posts 28 manufactured using an extrusion process, but also the anchor plates 30 are extruded; however, any other suitable process, may be used, but again, giving due consideration to the normal efficiency factors, such as relative strength and cost.

Another important feature of the present invention, is that the anchor plate 30 extends along the full height of the post 28, thus giving full reinforcement. Preferably, the width of flanges 38 is chosen to present sufficient cross-sectional and surface area to properly seat anchor plate 30 thereon and withstand the expected pulling stress exerted due to lading tie-down. The flanges 38 are spaced sufficiently from the walls 14, 16 of the cargo container so that insulation may be used, such as sheets of plywood.

The elongated anchor plate 30 comprises a central section 32 and a pair of opposingly disposed wings 44 made integral with said central section. Integral with and perpendicular to the rear face of central section 32 is a lateral guide means comprising essentially parallel, spaced-apart boss elements 46. Elements 46 are each positioned on the rear face of central portion 32 adjacent sides 60 and 62 of a slot or opening extending through central portion 32. These boss elements 46 positioned on the rear face of central portion 32 not only serve a guiding function, but perhaps more importantly, serve to substantially strengthen and rigidify the area along the sides 60, 62 of the slots 34 in order to better resist the lading pulling forces concentrated in this area.

The fact that the anchor plate 30 is of sufficient length to extend from a point at the bottom of structural post 28, means that it is advantageously locked against downward axial sliding movement by the side rail 22 and the floor F. At the top, the anchor plate 30 is similarly locked against upward sliding movement by engagement with the edge cap 23. This is the reason that no fasteners are needed as earlier alluded to.

Lading tie-down means, such as a strap 56, is attached to anchor plate 30 through T-fastener or hook 54 having a body 66 and cross-piece 68. The slot 34 in the anchor plate 30 has a width as measured by the distance between the sides 60 and 62, which is less than the length of the cross-piece 68 of fastener 54, but sufficiently wide to allow insertion of the fastener 54, as is clear by merely turning at 90° from the position shown in FIG. 2. The sliding relationship between flanges 38 of the post 28 and central portion 32 of the anchor plate 30 is provided by the grooves formed between the rear face of central portion 32 and the wings 44. As shown, the wings 44 run parallel to the surface of the rear face said central portion 32 and are spaced apart therefrom a distance corresponding to the thickness of flanges 38 to allow a close frictional fit between the parts. Preferably, the mating corner formed at the intersection of the wings 44 and the edges of the flanges 38 is rounded by an enlarged longitudinal bead 50 to strengthen this critical area.

The cargo container 12, and more particularly, the wall structures using the post-anchor assembly 28, 30 of the present invention, are easily and efficiently constructed further adding to the advantages over the prior art. First, the outer skin 14, 16 is attached to the support posts 28 by any convenient means, such as conventional rivets 26. The rivets 26 are easily installed since both ends are now accessible, i.e. through the open space 52 of post 28 for the end of the rivet 26 facing inwardly (FIG. 2) and from the outside (FIG. 1). The anchor plate 30 is now simply threaded onto the top end of each post 28 and pushed downwardly until the full length of the two parts mate to form the assemblies 28, 30. The wall structures are next placed on the floor F which already has the side rails 22 in position, and then are secured together and to said side rail. The roof 43 is placed in position and the edge cap 23 installed and secured. The necessary sealant is provided to eliminate the possibility of seepage, thereby completing the construction.

Once installed, the individual posts 28 and/or anchor plates 30 may easily be serviced by removing roof 43 in the affected area, sliding the damaged anchor upwardly to free it from the corresponding post 28, and then removing the rivets 26 that are now accessible from both ends thereof. The new assembly can then be installed. If the anchor plate 30 alone is damaged, the new plate may be installed by sliding action without removing the post 28 thus saving time as well as total cost of the replacement part.

In operation, assuming that a load is positioned in the cargo container 12 up to one of the post-anchor assemblies 28, 30 along the length of said container 12, one end of the strap 56 may be secured to the anchor plate 30 by aligning the cross piece 68 of the hook 54 with slot 34, inserting the hook or fastener therethrough, turning the fastener ninety degrees and then seating the cross piece 68 against the rear face of anchor 30. Any suitable slack take-up means (not shown) may be employed along the strap 56 to stretch the same and secure the load.

In summary, it can be seen that a new concept in construction of a container for cargo or the like is incorporated in the post-anchor assembly 28, 30 disclosed herein. The anchor plate 30 slidably engages the post 28 for ease of assembly of the structure, and the combination gives improved strength characteristics over previous designs. The slot 34 is centered along the assembly 28, 30 and the boss elements 46 are provided at this point so that the maximum resistance to bending due to the load of the tie-down straps 56 is realized. Both the post 28 and the anchor plate 30 extend along the full height of the walls 14, 16 so that maximum strength is gained and the locking of the two parts together by abutment with the side rail 22 and the edge cap 23 is possible.

In this disclosure, there is shown and described only the preferred embodiment of the invention, but, as aforementioned, it is to be understood that the invention is capable of changes or modifications within the scope of the inventive concept as expressed herein.

What is claimed is:

1. A post and tie-down anchor assembly adapted to receive a tie-down fastener and to support a permanent wall of a cargo container or the like comprising a channel shaped support post having a pair of oppositely directed flanges on the lateral edges thereof, an elongated anchor plate extending for substantially the full length of said support post, said anchor plate having a central portion and longitudinally extending grooves adjacent thereto for slidingly engaging said flanges, the central portion of said plate overlying the open space in said channel, means for retaining said anchor plate in substantially fixed relationship with respect to the full length of said post in the longitudinal direction, and means on said central portion of said anchor plate for attaching said tie-down fasteners, whereby increased strength and centered tie-down capability are provided.

2. The support post and tie-down anchor assembly of claim 1 wherein said anchor plate further includes a pair of opposingly disposed wings extending outwardly from said central portion and substantially the full length of said post to strengthen said anchor plate and said assembly, the inner edges of said wings forming said grooves with said central portion.

3. The support post and tie-down anchor assembly of claim 1 wherein said retaining means includes cap and rail means and the top and bottom of said container, the respective ends of said post and said anchor plate abutting said cap and rail means and the top and bottom to lock the same against sliding movement.

4. The support post and tie-down anchor assembly of claim 1 wherein are further provided boss elements extending from said central portion of said anchor plate substantially perpendicular thereto and substantially the full length of said post and extending into said open space of said post, whereby to increase the strength of said anchor plate adjacent said attachment means.

5. The support post and tie-down anchor assembly of claim 4 wherein said attaching means comprises spaced slots in said central portion extending substantially the full length of said post and in the direction of said elongated anchor plate.

* * * * *